United States Patent
Yamashita et al.

(10) Patent No.: US 12,158,607 B2
(45) Date of Patent: Dec. 3, 2024

(54) PROPAGATION MODE LOSS DIFFERENCE COMPENSATOR

(71) Applicant: NIPPON TELEGRAPH AND TELEPHONE CORPORATION, Tokyo (JP)

(72) Inventors: Yoko Yamashita, Musashino (JP); Takashi Matsui, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 222 days.

(21) Appl. No.: 17/919,327

(22) PCT Filed: Apr. 24, 2020

(86) PCT No.: PCT/JP2020/017680
§ 371 (c)(1),
(2) Date: Oct. 17, 2022

(87) PCT Pub. No.: WO2021/214976
PCT Pub. Date: Oct. 28, 2021

(65) Prior Publication Data
US 2023/0176284 A1    Jun. 8, 2023

(51) Int. Cl.
G02B 6/14        (2006.01)
G02B 6/122       (2006.01)

(52) U.S. Cl.
CPC ............ *G02B 6/14* (2013.01); *G02B 6/1228* (2013.01)

(58) Field of Classification Search
None
See application file for complete search history.

(56) References Cited

U.S. PATENT DOCUMENTS 11,635,570 B1 * 4/2023 Thompson ........... G02B 6/1228
                                                      385/28
2021/0234326 A1   7/2021 Yamashita et al.

FOREIGN PATENT DOCUMENTS

JP          2020-024271 A      2/2020

OTHER PUBLICATIONS

K. Saitoh et al., "PLC-based mode multi/demultiplexers for mode division multiplexing", Opt. Fiber Technol., vol. 35, pp. 80-92, Feb. 2017.

(Continued)

*Primary Examiner* — Chad H Smith

(57) ABSTRACT

A mode loss difference compensator of the present disclosure includes a main waveguide configured to allow propagation of N or more modes (where N is an integer of 3 or more), a first auxiliary waveguide having, at one end thereof, a first coupling portion configured to mode-convert an LP0n mode (where n is an integer of 2 or more) propagating in the main waveguide into a fundamental mode in the first auxiliary waveguide and transfer the fundamental mode from the main waveguide to the first auxiliary waveguide and having, at the other end thereof, a second coupling portion configured to mode-convert the fundamental mode propagating in the first auxiliary waveguide into the LP0n mode (where n is an integer of 2 or more) in the main waveguide and transfer the LP0n mode from the first auxiliary waveguide to the main waveguide, and a second auxiliary waveguide having, at one end thereof, a third coupling portion configured to convert a higher-order mode, other than any LP0n mode (where n is an integer of 2 or more), propagating in the main waveguide into a fundamental mode in the second auxiliary waveguide and transfer the fundamental mode from the main waveguide to the second auxiliary waveguide and having, at the other end thereof, a terminal end portion configured to eliminate the fundamental mode (Continued)

propagating in the second auxiliary waveguide from the second auxiliary waveguide, wherein the main waveguide includes a loss imparting portion configured to impart a loss to a fundamental mode propagating in the main waveguide between the first and second coupling portions.

11 Claims, 19 Drawing Sheets

(56) References Cited

OTHER PUBLICATIONS

Y. Yamashita et al., "Fiber-based differential mode attenuation compensator", EXAT 2019, p. 11, 2019.
T. Fujii et al., "Characteristic improvement of long-period fiber gratings fabricated by femtosecond laser pulses using novel positioning technique", OFC2004, ThC6, 2004.
Masanori Koshiba, "Optical Waveguide Analysis", Applied Physics vol. 61, No. 1, 1992 with machine translated partial English translation thereof.

* cited by examiner

[9]

(A)

(B)

PROPAGATION MODE LOSS DIFFERENCE COMPENSATOR

CROSS-REFERENCE TO RELATED APPLICATIONS

This application is a 371 U.S. National Phase of International Application No. PCT/JP2020/017680, filed on Apr. 24, 2020. The entire disclosure of the above application is incorporated herein by reference.

TECHNICAL FIELD

The present disclosure relates to a mode loss difference compensator that compensates for a difference in loss between modes of signal light propagating in a transmission line.

BACKGROUND ART

Transmission traffic has continued to increase due to the diversification of communication services and attempts have been made to increase the transmission capacity through an increase in the transmission speed and wavelength division multiplexing. Mode multiplexing transmission using a multimode optical fiber has attracted attention as an attempt to further increase the transmission capacity for the future.

To increase the distance of mode multiplexing transmission, it is important to reduce or compensate for the difference in loss between modes (differential modal attenuation: DMA) caused in a transmission line and the difference in gain between modes (differential modal gain: DMG) caused in an optical amplifier. For example, a mode loss difference compensator for 2LP modes in which a hollowed region is provided in a core to impart a loss to the fundamental mode has been proposed (see, for example, PTL 1).

CITATION LIST

Patent Literature

PTL 1: JP 2020-024271 A

Non Patent Literature

NPL 1: K. Saitoh et al., "PLC-based mode multi/demultiplexers for mode division multiplexing," Opt. Fiber Technol., Vol. 35, pp. 80-92, February 2017.
NPL 2: Y. Yamashita et al., "Fiber-based differential mode attenuation compensator," EXAT 2019, P-11, 2019
NPL 3: T. Fujii et al., "Characteristic improvement of long-period fiber gratings fabricated by femtosecond laser pulses using novel positioning technique," OFC2004, ThC6
NPL 4: Masanori Koshiba, "Optical Waveguide Analysis," Applied Physics Vol. 61, No. 1, 1992

SUMMARY OF THE INVENTION

Technical Problem

The method described in PTL 1 can handle up to about two modes, but it is difficult to impart an arbitrary loss to only a specific propagation mode as the number of modes increases. A new mode loss difference compensator is required to provide mode multiplexing transmission using a large number of propagation modes in the future.

It is an object of the present disclosure to provide a mode loss difference compensator for mode multiplexing transmission using a large number of propagation modes.

Means for Solving the Problem

The mode loss difference compensator according to the present disclosure separates modes propagating in a waveguide, imparts a loss to each mode, and then couples the modes again to compensate for the difference in loss between the modes.

Specifically, a mode loss difference compensator according to the present disclosure includes a main waveguide configured to allow propagation of N or more modes (where N is an integer of 3 or more), a first auxiliary waveguide whose fundamental mode is phase-matched with an LP0n mode (where n is an integer of 2 or more) propagating in the main waveguide, the first auxiliary waveguide having, at one end thereof, a first coupling portion configured to mode-convert the LP0n mode (where n is an integer of 2 or more) propagating in the main waveguide into the fundamental mode in the first auxiliary waveguide and transfer the fundamental mode from the main waveguide to the first auxiliary waveguide and having, at the other end thereof, a second coupling portion configured to mode-convert the fundamental mode propagating in the first auxiliary waveguide into the LP0n mode (where n is an integer of 2 or more) in the main waveguide and transfer the LP0n mode from the first auxiliary waveguide to the main waveguide, and a second auxiliary waveguide whose fundamental mode is phase-matched with a higher-order mode, other than any LP0n mode (where n is an integer of 2 or more), propagating in the main waveguide, the second auxiliary waveguide having, at one end thereof, a third coupling portion configured to convert the higher-order mode, other than any LP0n mode (where n is an integer of 2 or more), propagating in the main waveguide into the fundamental mode in the second auxiliary waveguide and transfer the fundamental mode from the main waveguide to the second auxiliary waveguide and having, at the other end thereof, a terminal end portion configured to eliminate the fundamental mode propagating in the second auxiliary waveguide from the second auxiliary waveguide, wherein the main waveguide includes a loss imparting portion, configured to impart a loss to a fundamental mode propagating in the main waveguide, between the first and second coupling portions.

Specifically, a mode loss difference compensator according to the present disclosure includes a main waveguide configured to allow propagation of N or more modes (where N is an integer of 3 or more), a first auxiliary waveguide whose fundamental mode is phase-matched with an LP0n mode (where n is an integer of 2 or more) propagating in the main waveguide, the first auxiliary waveguide having, at one end thereof, a first coupling portion configured to mode-convert the LP0n mode (where n is an integer of 2 or more) propagating in the main waveguide into the fundamental mode in the first auxiliary waveguide and transfer the fundamental mode from the main waveguide to the first auxiliary waveguide and having, at the other end thereof, a second coupling portion configured to mode-convert the fundamental mode propagating in the first auxiliary waveguide into the LP0n mode (where n is an integer of 2 or more) in the main waveguide and transfer the LP0n mode from the first auxiliary waveguide to the main waveguide, and a second auxiliary waveguide whose fundamental mode is phase-matched with a higher-order mode, other than any LP0n mode (where n is an integer of 2 or more), propagating in the main waveguide, the second auxiliary waveguide having, at one end thereof, a third coupling portion configured to convert the higher-order mode, other than any LP0n mode (where n is an integer of 2 or more), propagating in the main waveguide into the fundamental mode in the second auxiliary waveguide and transfer the fundamental mode from the main waveguide to the second auxiliary waveguide and having, at the other end thereof, a fourth coupling portion configured to mode-convert the fundamental mode propagating in the second auxiliary waveguide into the higher-order mode, other than any LP0n mode (where n is an integer of 2 or more), in the main waveguide and transfer the higher-order mode from the second auxiliary waveguide to the main waveguide, wherein the main waveguide includes a loss imparting portion, configured to impart a loss to a fundamental mode propagating in the main waveguide, between the first and second coupling portions and a first long-period grating, having a predetermined loss-wavelength spectrum, between the first and second coupling portions, the first auxiliary waveguide includes a second long-period grating, having a predetermined loss-wavelength spectrum, between the first and second coupling portions, and the second auxiliary waveguide includes a third long-period grating, having a predetermined loss-wavelength spectrum, between the third and fourth coupling portions.

Effects of the Invention

According to the present disclosure, it is possible to provide a mode loss difference compensator for mode multiplexing transmission using a large number of propagation modes.

DESCRIPTION OF EMBODIMENTS

Hereinafter, embodiments of the present disclosure will be described in detail with reference to the drawings. The present disclosure is not limited to the embodiments shown below. These examples of implementation are merely examples and the present disclosure can be implemented in various modified and improved forms based on the knowledge of those skilled in the art. It is assumed that components having the same reference signs in the present specification and drawings indicate components which are the same.

First Embodiment

When the effective refractive indices of specific modes of two adjacent optical waveguides match, phase matching occurs, and when the two optical waveguides are brought sufficiently close to each other, light coupling occurs. A waveguide having such a function is called a directional coupler (see NPL 1). In the present embodiment, the effective refractive indices of an arbitrary high-order mode propagating in a main waveguide of a directional coupler and a fundamental mode propagating in an auxiliary waveguide (see, for example, NPL 4) are matched to transfer a specific mode propagating in the main waveguide to the auxiliary waveguide and impart a loss to the specific mode, thus adjusting the intensity of each mode using the directional coupler.

The amount of coupling for transfer from the main waveguide to the auxiliary waveguide or the amount of coupling for transfer from the auxiliary waveguide to the main waveguide can have any value by a change in an interaction length Lc_m (where m is a natural number) which is the length of the coupling region. The effective refractive index is adjusted using the waveguide radius and the refractive index of the auxiliary waveguide. It is possible to selectively extract a mode from the main waveguide to the auxiliary waveguide by adjusting the effective refractive index of the main waveguide or the auxiliary waveguide. All LP0n modes of the main waveguide (where n is an integer of 2 or more, which is the same below) are extracted to auxiliary waveguides and are partially returned to the main waveguide. Higher-order modes other than the LP0n modes in the main waveguide are partially extracted to auxiliary waveguides and then radiated.

When extracting a fundamental mode from the main waveguide using the directional coupler, the waveguide radius of the auxiliary waveguide needs to be made equal to the waveguide radius of the main waveguide. In this situation, the effective refractive indices of other higher-order modes of the main waveguide and the auxiliary waveguide also match and the other higher-order modes are also extracted at the same time and thus it is difficult to impart an arbitrary loss to only the fundamental mode using the directional coupler. Thus, a change in the refractive index is caused inside the main waveguide to impart a loss to the fundamental mode of the main waveguide.

Figure 1:
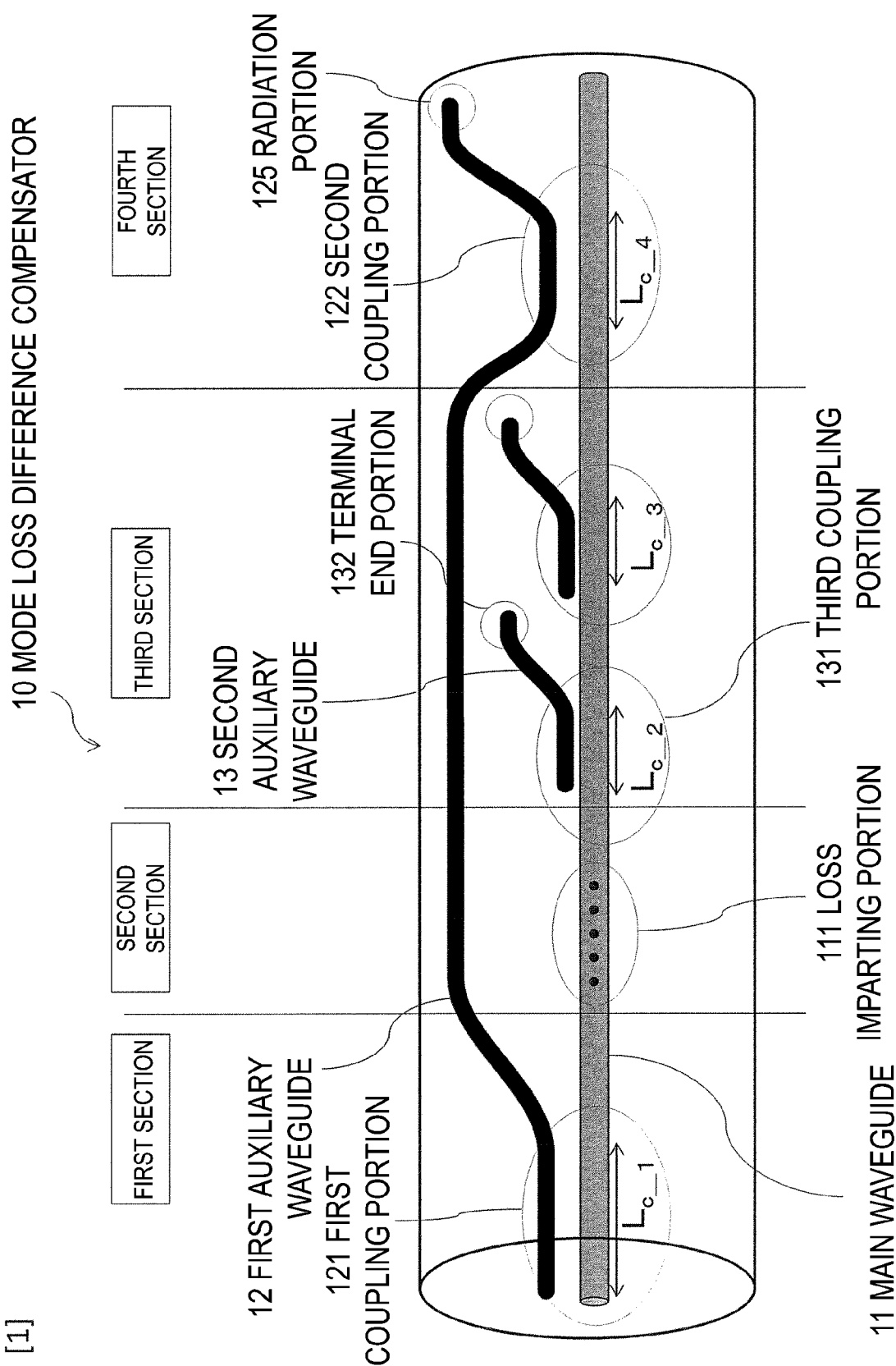
FIG. 1 is a diagram for explaining a structure of a mode loss difference compensator.

FIG. 1 illustrates a configuration of a mode loss difference compensator of the present embodiment. In FIG. 1, 10 indicates the mode loss difference compensator, 11 indicates a main waveguide, 111 indicates a loss imparting portion, 12 indicates first auxiliary waveguides, 121 indicates first coupling portions, 122 indicates second coupling portions, 125 indicates radiation portions, 13 indicates a second auxiliary waveguide, 131 indicates a third coupling portion, and 132 indicates a terminal end portion.

Because the electric field distributions of LP0n modes of the main waveguide 11 overlap to a large extent that of an LP01 mode which is a fundamental mode of the main waveguide 11, when a loss is imparted to the fundamental mode, the LP0n modes may also suffer a loss at the same time. Therefore, in the present invention, after all LP0n modes are temporarily extracted from the main waveguide 11 using directional couplers and a loss is imparted to the fundamental mode, the extracted LP0n modes are returned back to the main waveguide 11 using directional couplers.

In FIG. 1, the first coupling portions 121 that transfer propagation modes from the main waveguide 11 to the first auxiliary waveguides 12 are disposed in a first section. The loss imparting portion 111 that imparts a loss to the fundamental mode is disposed on the main waveguide 11 in a second section. The third coupling portion 131 that transfers a propagation mode from the main waveguide 11 to the second auxiliary waveguide 13 is disposed in a third section. Here, the number of pairs of the third coupling portion 131 and the second auxiliary waveguide needs to be one or more. Second coupling portions 122 that transfer propagation modes from the first auxiliary waveguides 12 to the main waveguide 11 are disposed in a fourth section. As many sets of the first coupling portions 121 in the first section, the first auxiliary waveguides 12, and the second coupling portions 122 may be disposed as necessary. The first section, the second section, and the fourth section need to be arranged in this order in the traveling direction of light waves. The third coupling portion 131 in the third section may be disposed anywhere.

In the first section, the first coupling portions 121 are directional couplers formed of the main waveguide 11 and the first auxiliary waveguides 12. The number of the first coupling portions 121 disposed is the same as the number of LP0n modes excluding the fundamental mode propagating in the main waveguide 11. Each of the first coupling portions 121 mode-converts an LP0n mode propagating in the main waveguide 11 into a fundamental mode of a corresponding first auxiliary waveguide 12 and transfers the fundamental mode from the main waveguide 11 to the first auxiliary waveguide 12. The first auxiliary waveguide 12 propagates light of the transferred mode to the fourth section and again forms a second coupling portion 122 in the fourth section.

For example, four first auxiliary waveguides 12, whose fundamental modes are phase-matched with propagation modes LP02, LP03, LP04, and LP05 excluding the fundamental mode propagating in the main waveguide 11, are disposed. The four first auxiliary waveguides 12 together with the main waveguide 11 form first coupling portions 121 and second coupling portions 122 that are directional couplers.

In the second section, the loss imparting portion 111 is disposed. The loss imparting portion 111 causes a change in the refractive index of the main waveguide 11 to impart a loss to the fundamental mode. Specifically, a loss can be imparted only to the fundamental mode by providing a hollowed portion described in NPL 2 in a central portion of the main waveguide 11. Not only the hollowed portion but also a grating structure as described in NPL 3 can achieve the same effect.

In the third section, the same number of second auxiliary waveguides 13 as the number of higher-order modes other than the LP0n modes are disposed to extract the higher-order modes other than the LP0n modes from the main waveguide 11. The third coupling portions 131 are formed at one ends of the second auxiliary waveguides 13. Each third coupling portion 131 is a directional coupler formed of a second auxiliary waveguide 13 and the main waveguide 11. For example, four second auxiliary waveguides 13 for the LP11a, LP11b, LP21a, and LP21b modes, excluding the LP01 and LP02 modes, are provided when they are waveguides in which 4LP modes propagate. The effective refractive indices of the second auxiliary waveguides 13 match the effective refractive indices of the higher-order modes propagating in the main waveguide 11.

The third coupling portions 131 convert the higher-order modes propagating in the main waveguide 11 into the fundamental modes of the second auxiliary waveguides 13 and transfer the fundamental modes from the main waveguide 11 to the second auxiliary waveguides 13. Terminal end portions 132 for eliminating fundamental modes propagating in the second auxiliary waveguides are disposed at the other ends of the second auxiliary waveguides 13. Here, an arbitrary amount of loss can be imparted to each mode by a change in the interaction length of a corresponding directional coupler according to each mode to adjust the amount of coupling from the main waveguide 11 to a corresponding second auxiliary waveguide 13.

In the fourth section, the first auxiliary waveguides 12 are brought closer to the main waveguide 11 again to form the second coupling portions 122. The second coupling portions 122 are directional couplers formed of the main waveguide 11 and the first auxiliary waveguides 12.

The second coupling portions 122 mode-convert the fundamental modes propagating in the first auxiliary waveguides 12 into LP0n modes of the main waveguide and transfer the LP0n modes from the first auxiliary waveguides 12 to the main waveguide 11. At this time, arbitrary losses are imparted to the LP0n modes by a change in the interaction lengths of the directional couplers to adjust the amounts of coupling. The first auxiliary waveguides 12 are separated from the main waveguide 11 again such that light remaining in the first auxiliary waveguides 12 are radiated from the radiation portions 125 to the cladding.

The mode loss difference compensator as illustrated in FIG. 1 can compensate for the loss of each propagation mode individually in mode multiplexing transmission using a large number of propagation modes.

When degenerate modes exist like those in an LP11 mode or an LP21 mode, a loss can be imparted without degenerate mode dependence by disposing two second auxiliary waveguides 13 in the same section at an angle corresponding to the inclination of the electric fields. For example, in the LP11 mode, electric fields of two degenerate modes are inclined at 90 degrees. It is necessary that the numbers of peaks of electric field distributions be the same in the coupling direction of the directional coupler as described in PTL 1. Therefore, when one directional coupler is disposed in one direction, it can transfer only one of the degenerate LP11 modes.

Figure 2A:
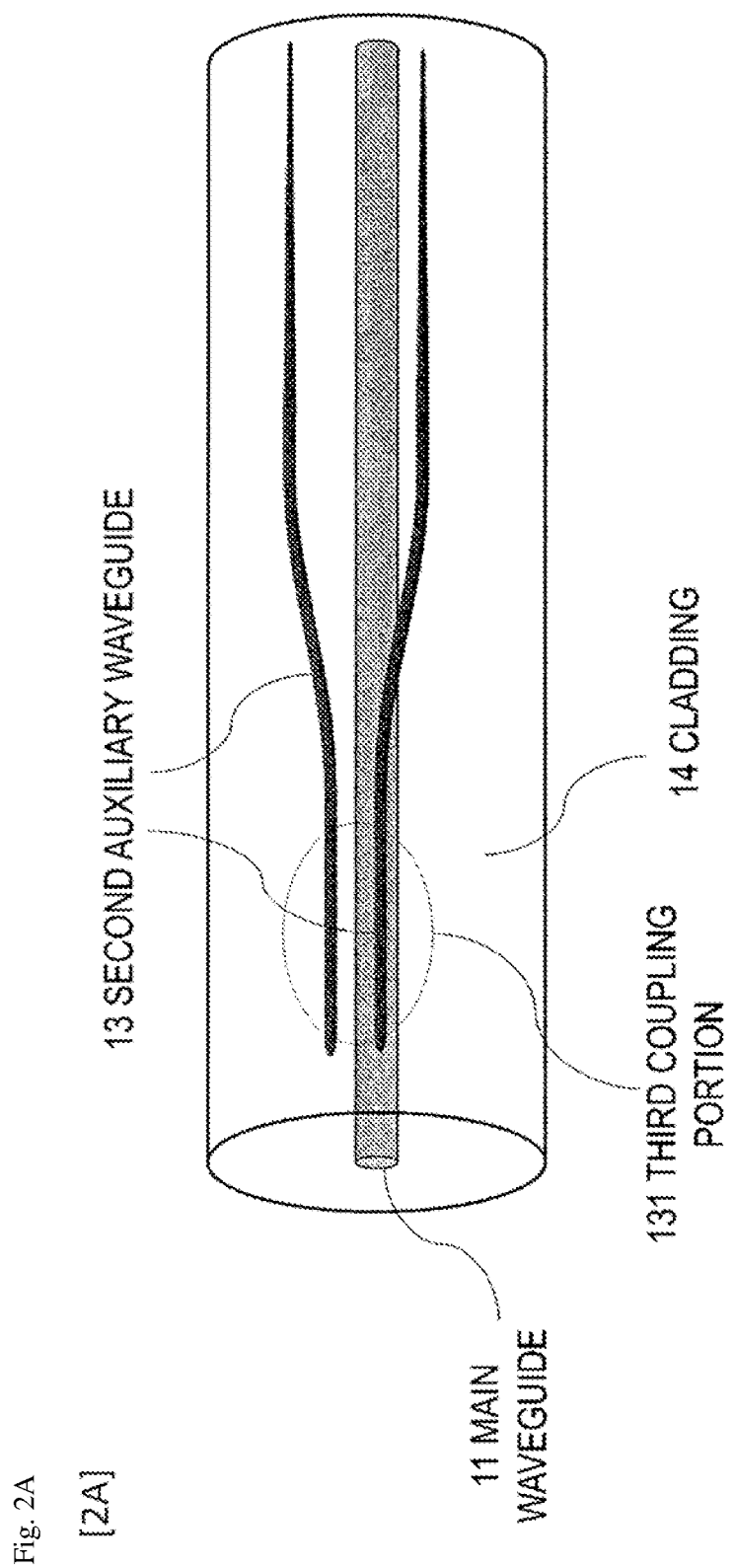
FIG. 2A is a diagram for explaining a structure of a directional coupler formed of an optical fiber.
Figure 2B:
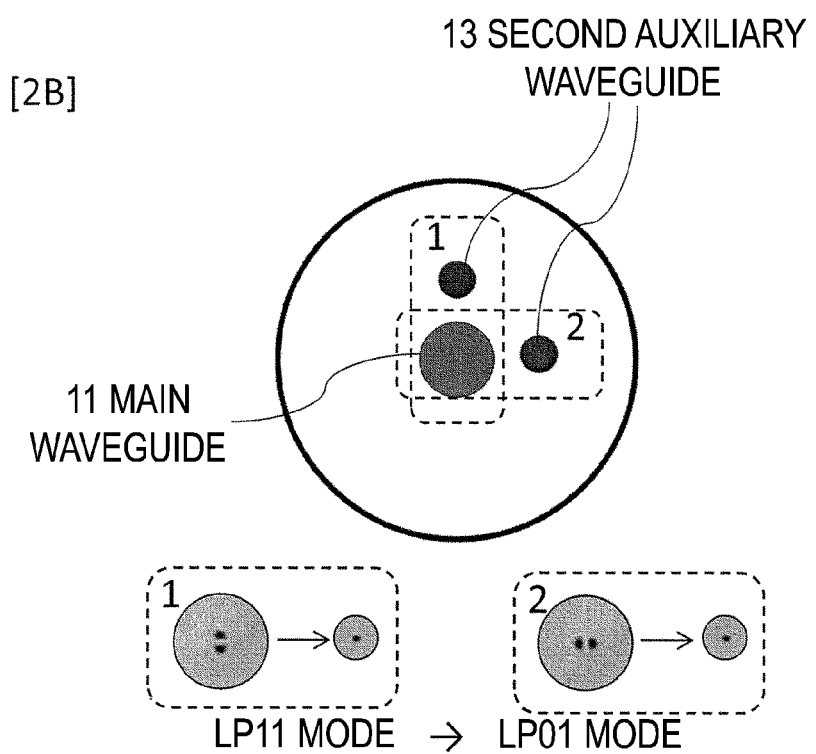
FIG. 2B is a diagram for explaining a structure of a directional coupler formed of an optical fiber.
Figure 2C:
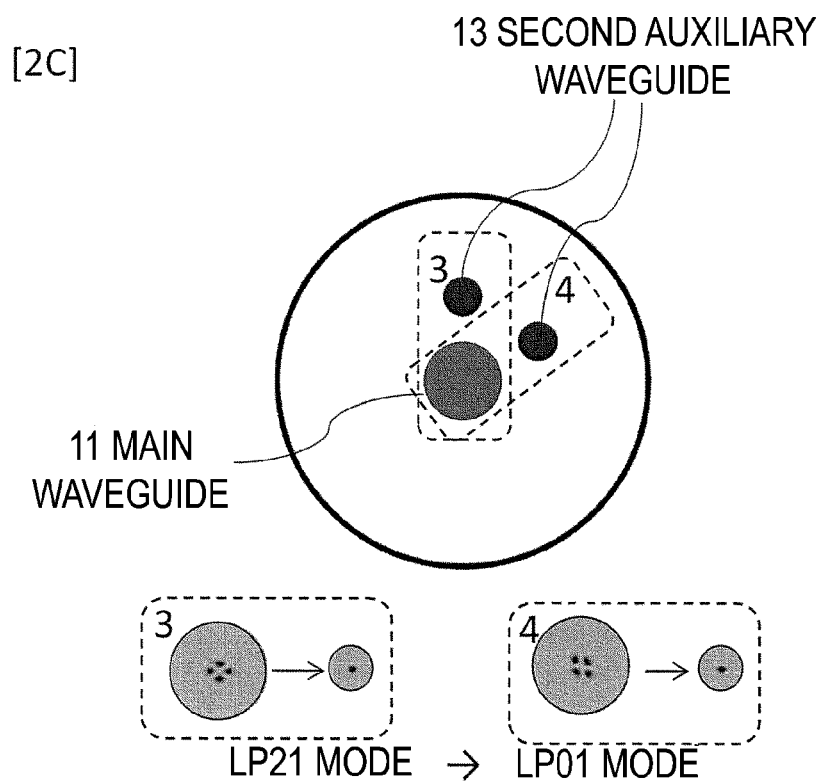
FIG. 2C is a diagram for explaining a structure of a directional coupler formed of an optical fiber.

FIG. 2A illustrates a structure of a directional coupler formed of an optical fiber to transfer two degenerate modes. Cross sections of the optical fiber in the direction perpendicular to the long axis direction are shown in FIGS. 2B and 2C. In FIGS. 2A, 2B and 2C, 11 indicates a main waveguide, 13 indicates second auxiliary waveguides, 131 indicates a third coupling portion, and 14 indicates a cladding. The main waveguide 11 and the second auxiliary waveguides 13 constitute a core with respect to the cladding 14. The second auxiliary waveguides 13 and the main waveguide 11 are brought close to each other to form a third coupling portion 131.

Two degenerate LP11 modes can be transferred by constructing two directional couplers spaced 90 degrees apart about the main waveguide 11 as illustrated in FIG. 2B. The LP21 mode also includes a mixture of two degenerate modes with electric fields inclined at 45 degrees. Therefore, two degenerate LP21 modes can be transferred by constructing two directional couplers spaced 45 degrees apart about the main waveguide 11 as illustrated in FIG. 2C. The structures of FIGS. 2A, 2B and 2C can not only transfer degenerate modes of the main waveguide 11 to the second auxiliary waveguides 13, but can also transfer degenerate modes from the second auxiliary waveguides 13 to the main waveguide 11.

By disposing a plurality of auxiliary waveguides at an angle obtained by dividing 90 degrees by the circumferential order of the LP mode in such a way, it is possible to compensate for a loss difference even in a higher-order mode having degenerate modes.

In FIG. 1, a long-period grating structure, a tapered structure, or a structure of radiation to a cladding interface can be used as the structure of the terminal end portion 132 of each second auxiliary waveguide 13 in the third section. Here, it is necessary to sufficiently separate the terminal end portion 132 of each second auxiliary waveguide 13 from the main waveguide 11 to prevent light emitted from the terminal end portion 132 from being coupled again to the main waveguide 11.

Figure 3:
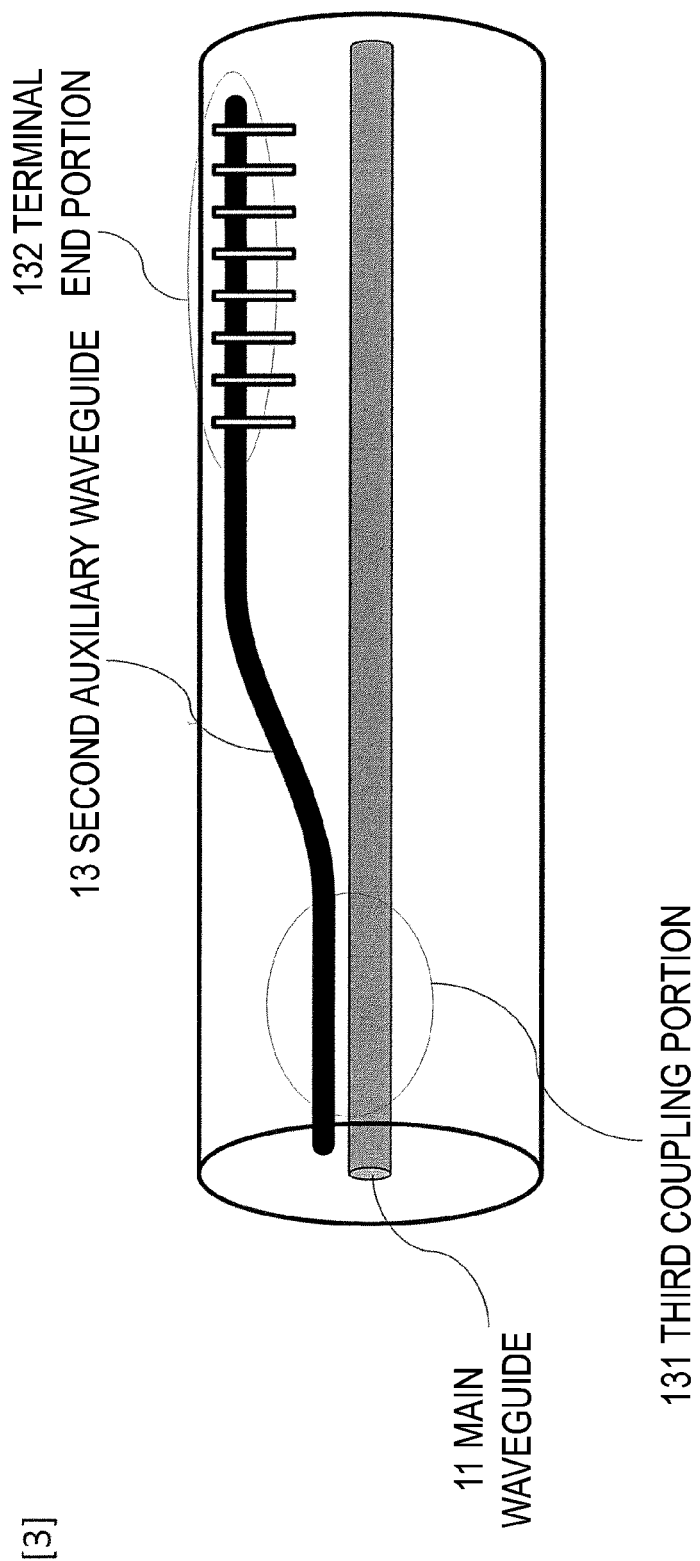
FIG. 3 is a diagram for explaining a structure in which a grating is used for a terminal end portion.

FIG. 3 illustrates a structure in which a grating is used for the terminal end portion 132. In FIG. 3, the grating of the terminal end portion 132 converts a fundamental mode propagating in the second auxiliary waveguide 13 into a cladding mode and radiates the cladding mode to the cladding. Because the transmission characteristics of the long-period grating depend on the wavelength of signal light, the period of the grating is, for example, chirped in the longitudinal direction to widen the band of wavelengths for coupling to the cladding mode.

Figure 4:
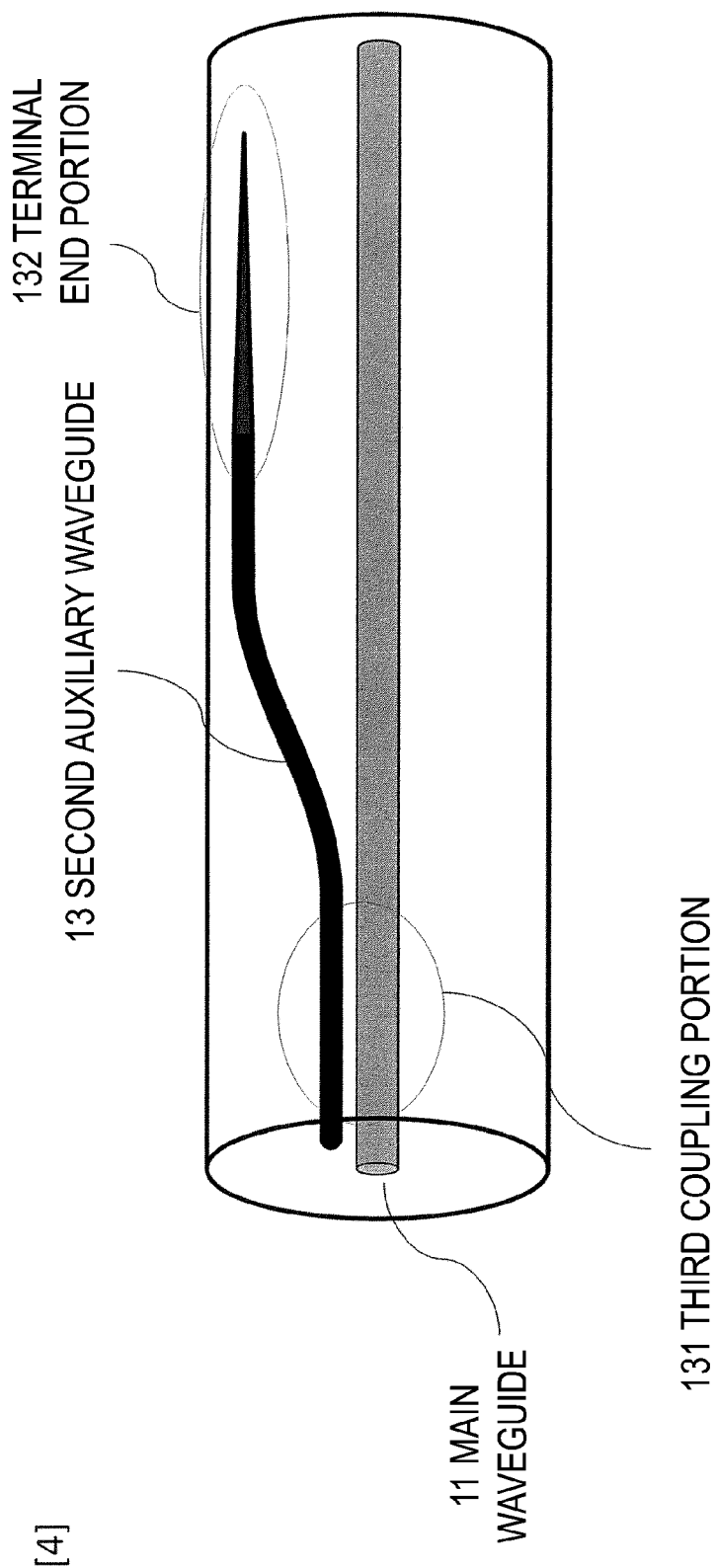
FIG. 4 is a diagram for explaining a structure in which a taper is used for a terminal end portion.

FIG. 4 illustrates a structure in which a taper is used for the terminal end portion 132. In FIG. 4, the waveguide radius of the second auxiliary waveguide 13 gradually decreases such that light propagating in the second auxiliary waveguide 13 is gradually released and radiated to the cladding.

Figure 5:
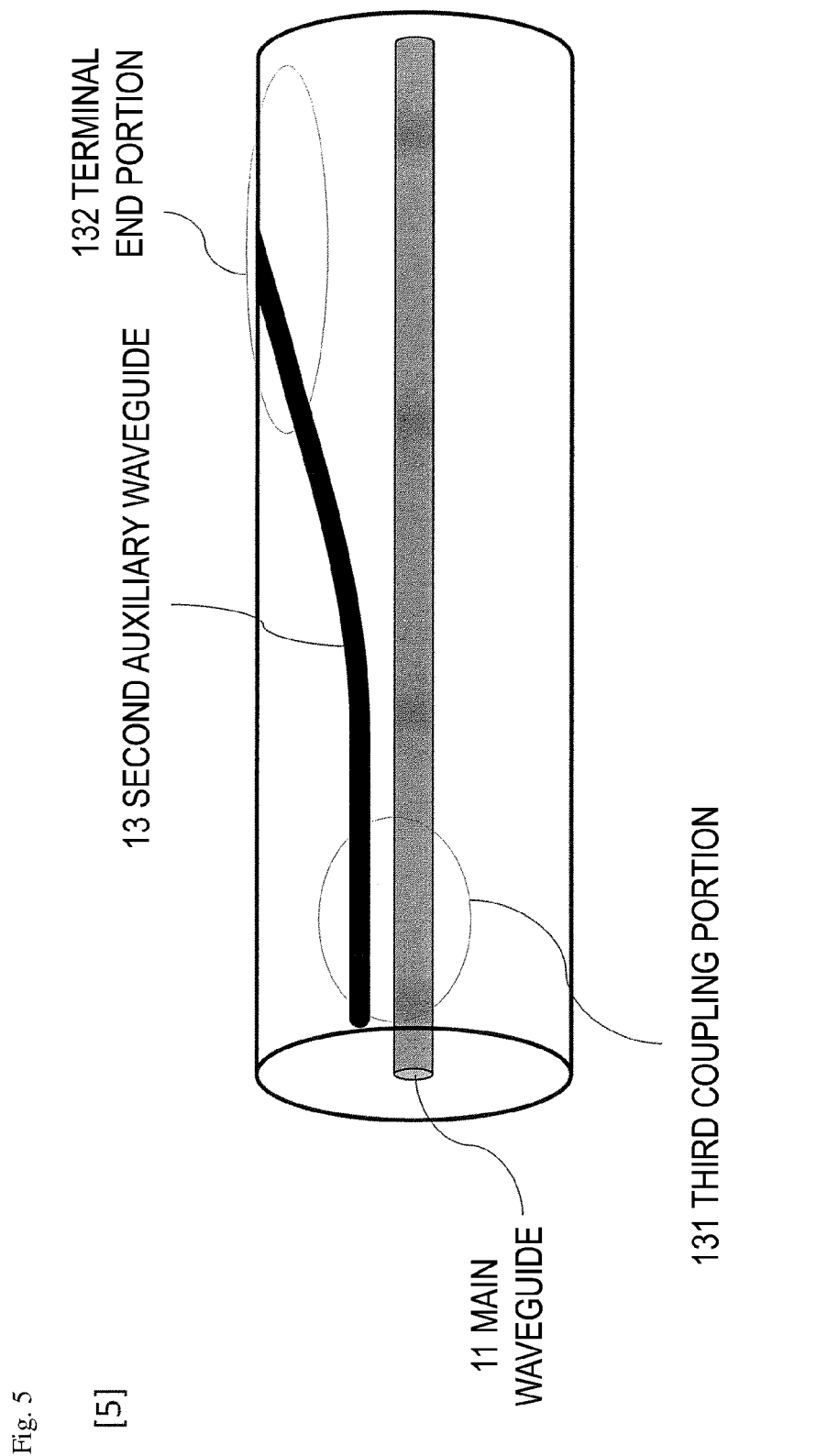
FIG. 5 is a diagram for explaining an example in which a radiation structure is used for a terminal end portion.

FIG. 5 illustrates an example in which a radiation structure is used for the terminal end portion 132. In FIG. 5, the other end of the second auxiliary waveguide 13 is disposed at the cladding interface such that light propagating in the second auxiliary waveguide 13 is radiated out of the cladding.

Figure 6:
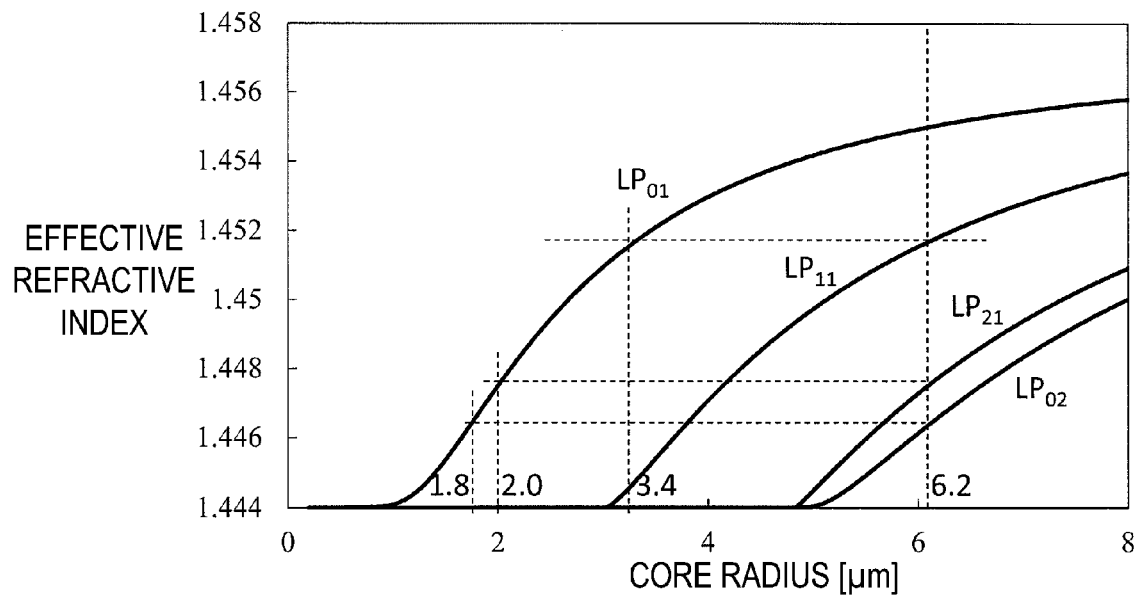
FIG. 6 is a diagram for explaining the relationship of the effective refractive indices of modes.

FIG. 6 shows the relationship between the waveguide radius (core radius) of a circular waveguide whose specific refractive index difference $\Delta=0.9\%$ and the effective refractive index of each mode. In the present disclosure, the first auxiliary waveguides and the second auxiliary waveguides may be collectively referred to simply as auxiliary waveguides. By disposing auxiliary waveguides having waveguide radii at which the effective refractive indices of fundamental modes of the auxiliary waveguides match the effective refractive indices of modes propagating in the main waveguide, the modes propagating in the main waveguide can be transferred to the auxiliary waveguides. For example, when the waveguide radius of the main waveguide 11 is 6.2 μm, a waveguide radius of the second auxiliary waveguides 13 for extracting the LP11 mode is 3.4 μm, a waveguide radius of the second auxiliary waveguides 13 for extracting the LP21 mode is 2.0 μm, and a waveguide radius of the first auxiliary waveguides 12 for extracting the LP02 mode is 1.8 μm.

Figure 7:
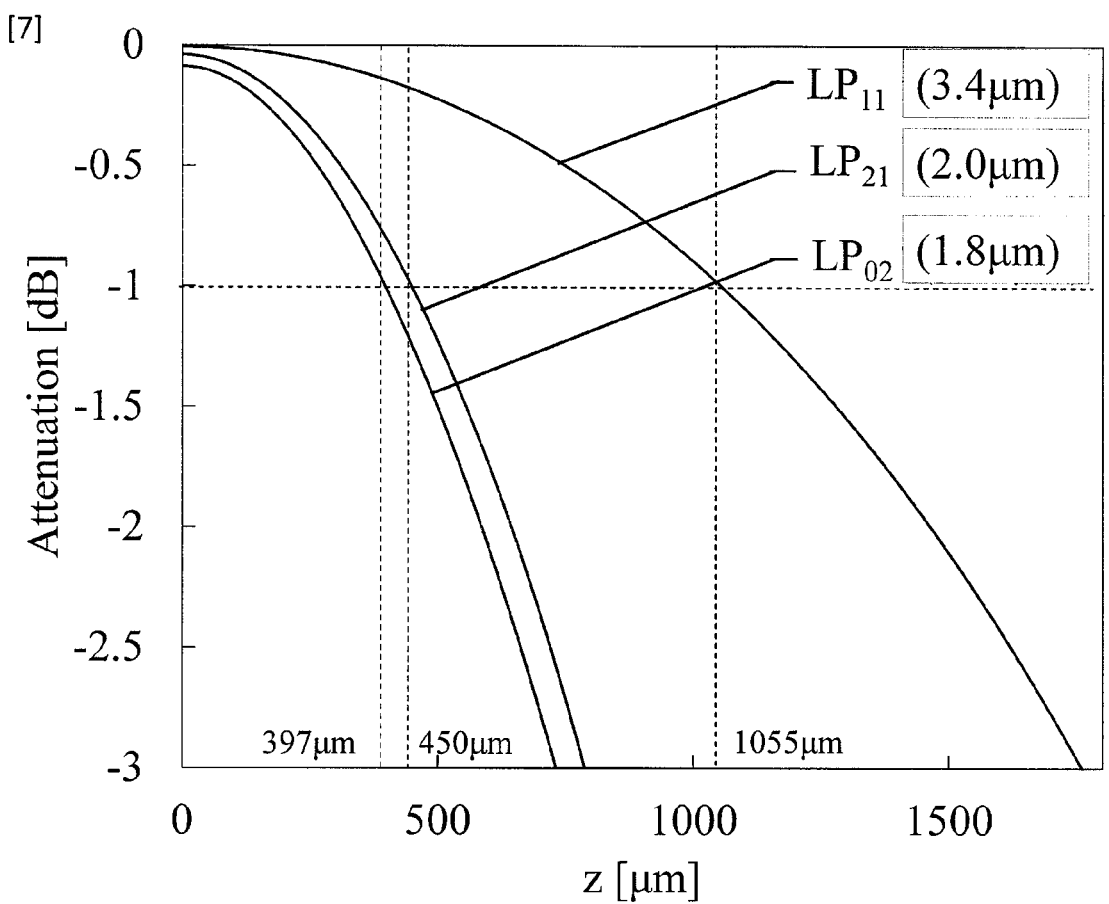
FIG. 7 is a diagram for explaining the relationship between the amount of loss imparted to each mode and an interaction length Z.

FIG. 7 shows the relationship between the amounts of loss imparted to the LP11, LP21, and LP02 modes and the interaction length Z, where the radius of the main waveguide is 6.2 μm and the radii of the auxiliary waveguides, individually corresponding to the modes, are 3.4 μm, 2.0 μm, and 1.8 μm. Here, a waveguide interval G between the main waveguide and the auxiliary waveguides is set to 3 μm.

The amount of coupling of each mode changes sinusoidally as the interaction length increases. An arbitrary amount of loss can be imparted to each mode by appropriately setting the interaction length Lc_m for each mode. For example, interaction lengths Lc_m for the LP11 mode, LP21 mode and LP02 mode are set to 1055 μm, 450 μm and 397 μm, respectively, when a loss of 1 dB is imparted to each mode.

The interaction length increases as the waveguide interval G increases as described in NPL 1. Thus, when the same amount of loss is to be imparted, it is necessary to increase the interaction length Lc_m as the waveguide interval G increases.

For example, a method of irradiating glass with a femtosecond laser is known for processing into an optical fiber. As illustrated in FIG. 1, an existing optical fiber core can be used as a main waveguide and a grating or a hollowed portion can be formed in the core and auxiliary waveguides can be formed in the cladding using a femtosecond laser.

Figure 8:
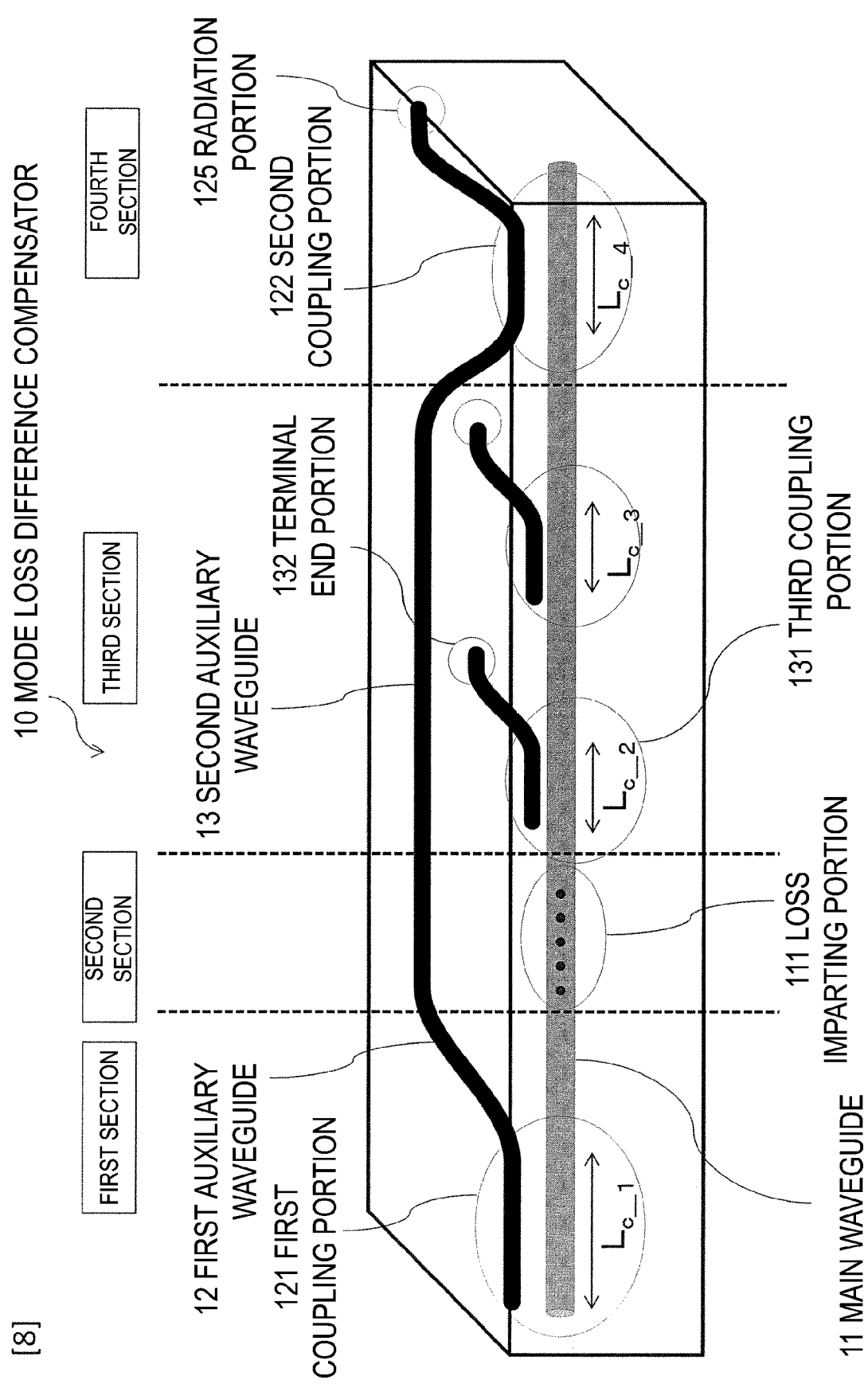
FIG. 8 is a diagram illustrating an example of a mode loss difference compensator using a transparent glass substrate.

A transparent glass substrate may also be used instead of the optical fiber. FIG. 8 illustrates an example of a mode loss difference compensator using a transparent glass substrate. In FIG. 8, 10 indicates the mode loss difference compensator, 11 indicates a main waveguide, 111 indicates a loss imparting portion, 12 indicates first auxiliary waveguides, 121 indicates first coupling portions, 122 indicates second coupling portions, 125 indicates radiation portions, 13 indicates a second auxiliary waveguide, 131 indicates a third coupling portion, and 132 indicates a terminal end portion. All components such as the main waveguide 11, the first auxiliary waveguides 12, the second auxiliary waveguide 13, the loss imparting portion 111, and the terminal end portions 132 such as gratings can also be formed by irradiating the transparent glass substrate with a femtosecond laser as illustrated in FIG. 8.

Second Embodiment

The LP21 and LP02 modes have very close effective refractive indices, and for example, the effective refractive index difference therebetween, in a main waveguide having a specific refractive index difference of $\Delta 0.9\%$ and a waveguide radius of 6.2 μm, is $1.1\times10^{-3}$. This effective refractive index difference corresponds to a difference of 0.2 μm when converted into a waveguide radius of an auxiliary waveguide of $\Delta 0.9\%$. If the waveguide radius of the auxiliary waveguide deviates by 0.2 μm or more in manufacturing the auxiliary waveguide, trying to extract only one of the modes (for example, the LP21 mode) results in transferring the other mode (for example, the LP02 mode) together and thus it is difficult to selectively impart a loss.

A ring-shaped high refractive index region is provided inside the main waveguide to increase the effective refractive index difference between the two modes and facilitate selective propagation mode extraction. However, providing the ring-shaped high refractive index region causes a loss due to mode mismatch at a connection point with a region without the ring. In addition, processing with a femtosecond laser is difficult for a region where the ring width is less than 0.5 µm. Thus, a region where the ring is to be designed is determined under design conditions that "the loss of four propagating modes be 0.1 dB or less" and "the ring width be 0.5 µm or more."

Figure 9:
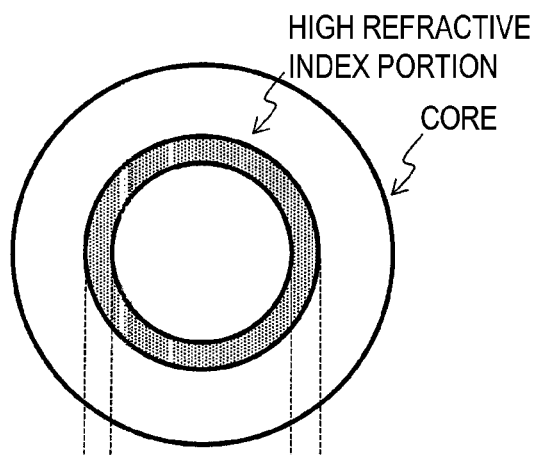
FIG. 9 is a diagram for explaining a cross-sectional structure of a circular waveguide having a ring-shaped high refractive index region.
Figure 9:
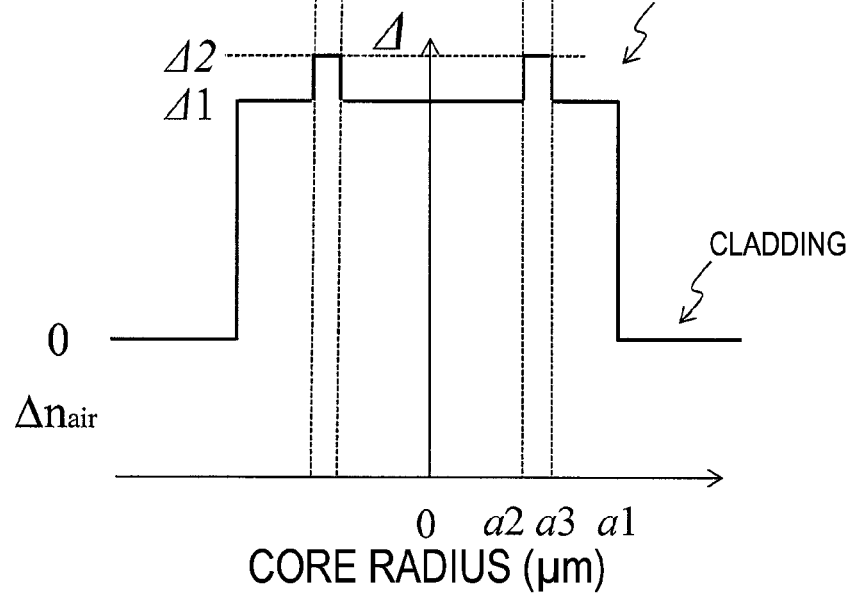

FIG. 9 illustrates a circular waveguide having a ring-shaped high refractive index region. FIG. 9(A) illustrates a cross-sectional structure of the circular waveguide and FIG. 9 (B) illustrates a refractive index distribution in the radial direction of the circular waveguide. Here, it is assumed that the waveguide radius of the main waveguide (core radius) is a1, the inner radius of the ring is a2, the outer radius of the ring is a3, and the specific refractive index differences of the main waveguide and the high refractive index portion with respect to a cladding portion are $\Delta 1$ and $\Delta 2$, respectively.

Figure 10:
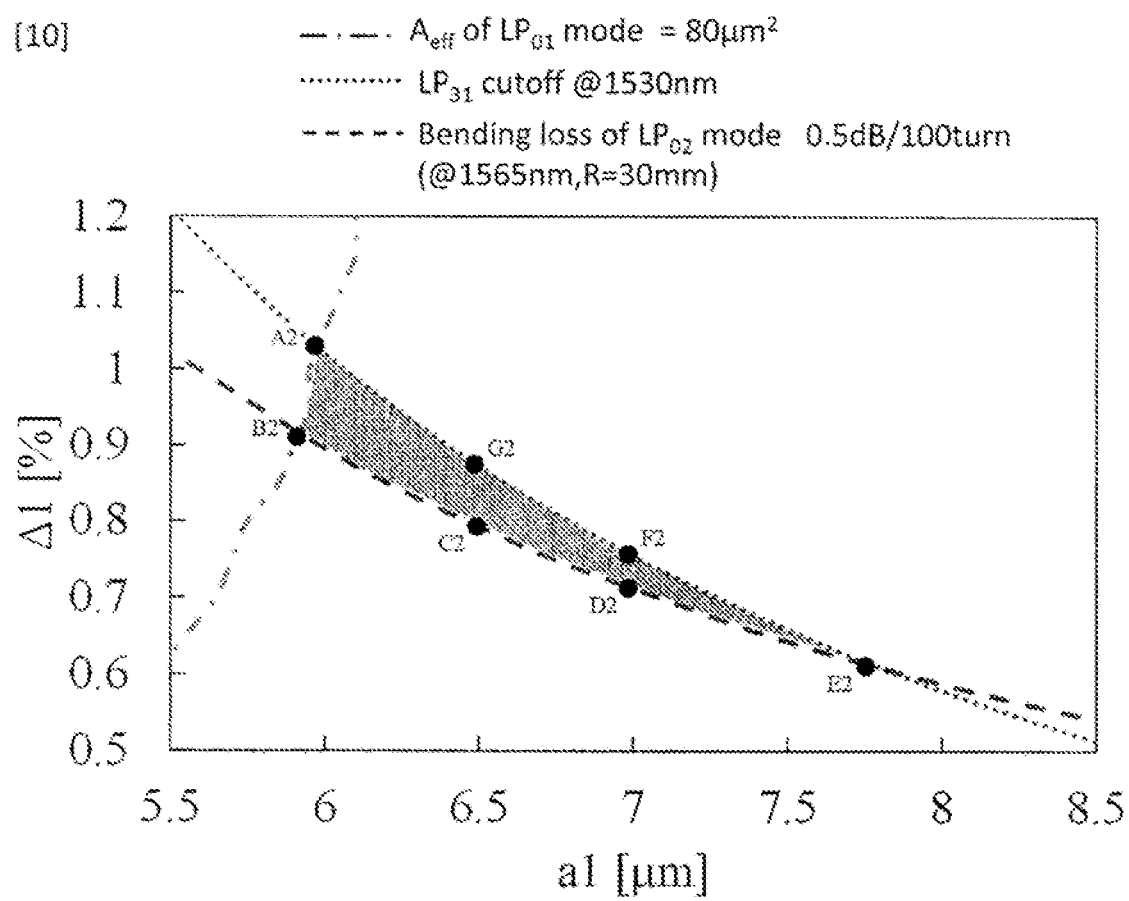
FIG. 10 is a diagram for explaining a region where a main waveguide allows propagation of 4LP modes.

FIG. 10 shows a region in which the main waveguide allows propagation of 4LP modes in an XY plane with the waveguide radius a1 of the main waveguide as the X axis and the specific refractive index difference $\Delta 1$ as the Y axis. In FIG. 10, a dotted line indicates a theoretical cutoff of the LP31 mode at a wavelength of 1530 nm (such that the LP31 mode does not propagate in a region below the dotted line) and a dashed line indicates a region where the bending loss of the LP02 mode at a wavelength of 1565 nm and a bending radius R=30 mm is 0.5 dB/100 turns or less (a region above the dashed line). In the region between the dotted line and the dashed line, 4LP mode transmission is possible in the C band (of wavelengths 1530 to 1565 nm). A dashed-dotted line indicates a region (below the dashed-dotted line) where the effective cross-sectional area of the LP01 mode is 80 µm² or more.

To more accurately describe a range in which 4LP modes transmission is possible, the optical fiber for mode loss difference compensation is designed such that the radius a1 of the main waveguide and the specific refractive index difference $\Delta 1$ fall within a region defined by a polygon having the following vertices in the XY plane with the radius a1 of the main waveguide as the X axis and the specific refractive index difference $\Delta 1$ as the Y axis.

A2 (6.0, 1.02)
B2 (5.9, 0.91)
C2 (6.5, 0.80)
D2 (7.0, 0.71)
E2 (7.75, 0.61)
F2 (7.0, 0.75)
G2 (6.5, 0.88)

Further, a V value that can be taken within the range in FIG. 10 is 4.8<V<5.1, the V value being defined as follows.

$$V = \frac{2\pi}{\lambda} a_1 n_1 \sqrt{2\Delta_1} \quad \text{[Math. 1]}$$

Here, $\lambda$ is the wavelength and n1 is the refractive index of the core.

Figure 11:
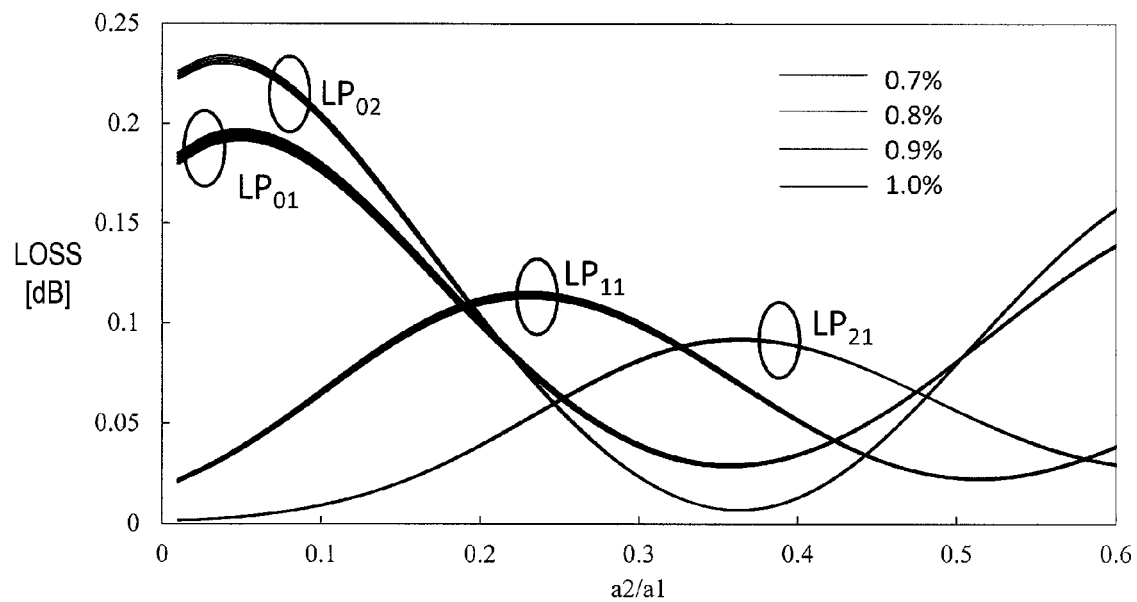
FIG. 11 is a diagram for explaining the relationship between the loss of each LP mode and $a_2/a_1$.

FIG. 11 shows the relationship between the loss of the 4LP modes and a2/a1, where the V value is kept constant at 5.1 while $\Delta 1$ and a1 vary. Here, (a3−a2)/a1 and $\Delta 2/\Delta 1$ are set such that (a3−a2)/a1=0.35 and $\Delta 2/\Delta 1$=1.3. It can be seen that the constant V value leads to very small variation in loss of each mode with respect to the variation in a1 and $\Delta 1$. Therefore, the design will hereinafter be made using the V value.

Figure 12:
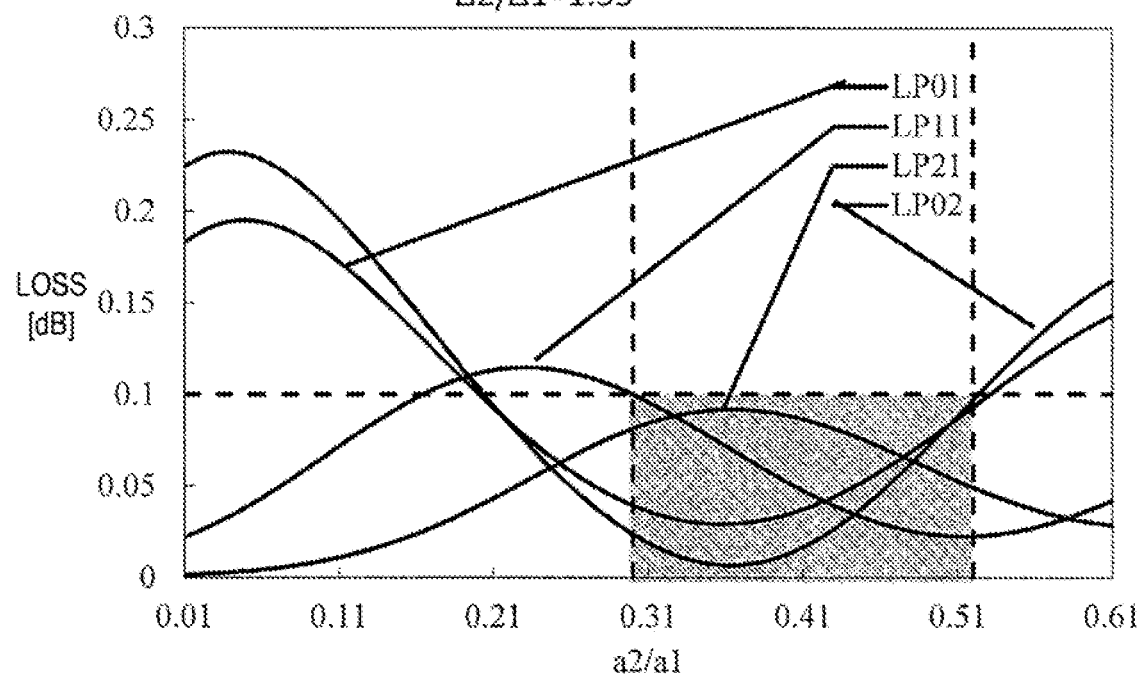
FIG. 12 is a diagram for explaining the relationship between the loss of each LP mode and $a_2/a_1$.

FIG. 12 shows the relationship between the loss of each LP mode and a2/a1, where V=5.1, (a3−a2)/a1=0.35, and $\Delta 2/\Delta 1$=1.35. The loss where $\Delta 1$=0.9% and a1=6.4 µm as an example is shown. The loss of each mode changes sinusoidally and it can be seen from FIG. 12 that the loss of all modes can be 0.1 dB or less in a range of 0.29<(a3−a2) <0.52.

Figure 13:
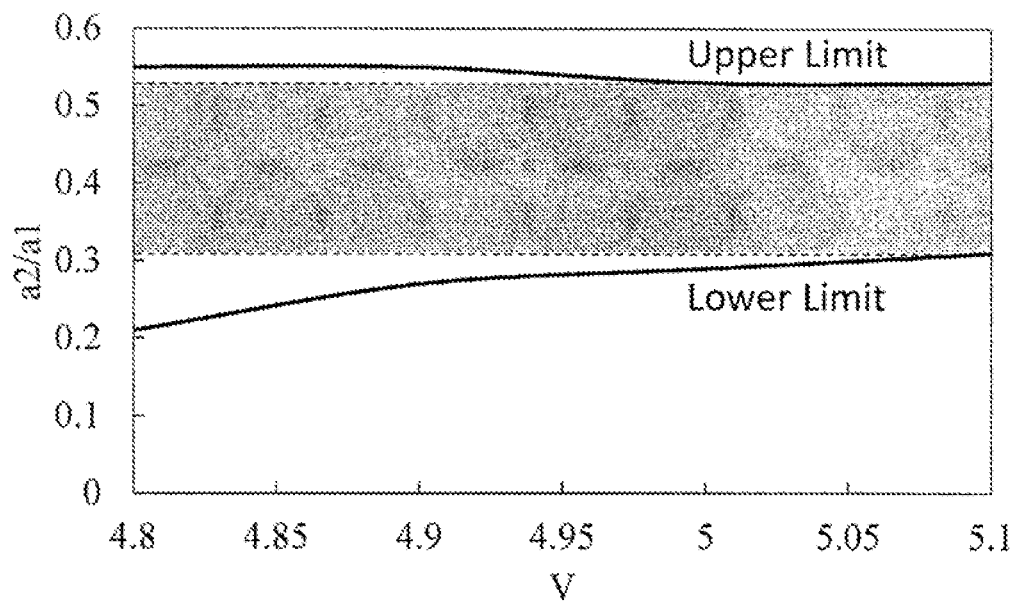
FIG. 13 is a diagram for explaining the relationship between a V value and upper and lower limit values of $a_2/a_1$.

In FIG. 12, upper and lower limit values of a2/a1 with which the loss of all modes can be 0.1 dB or less where V=5.1, (a3−a2)/a1=0.35, and $\Delta 2/\Delta 1$=1.35, are obtained as 0.29 and 0.52, respectively. The upper and lower limit values of a2/a1 are obtained in the same manner as in FIG. 12 while the V value varies in a range of 4.8 to 5.1 and the relationship between the V value and the upper and lower limit values of a2/a1 is shown in FIG. 13. In FIG. 13, an upper curve indicates the upper limit value of a2/a1 and a lower curve indicates the lower limit value and the loss of all modes is 0.1 dB or less in a range of a2/a1 surrounded by the two curves when (a3−a2)/a1=0.35 and $\Delta 2/\Delta 1$=1.35.

The variation in the range of a2/a1 in which the loss of each mode is 0.1 dB or less with respect to the variation in the V value is relatively small. For example, it can be seen from FIG. 13 that the loss condition is satisfied for any V value in a range of 0.3 to 0.52 between the minimum of the upper limit value and the maximum of the lower limit value. Thus, providing the ring-shaped high refractive index portion in the range of 0.3<a2/a1<0.52, when (a3−a2)/a1=0.35 and $\Delta 2/\Delta 1$=1.35, ensures that the loss can be 0.1 dB or less in all modes regardless of the V value.

Figure 14:
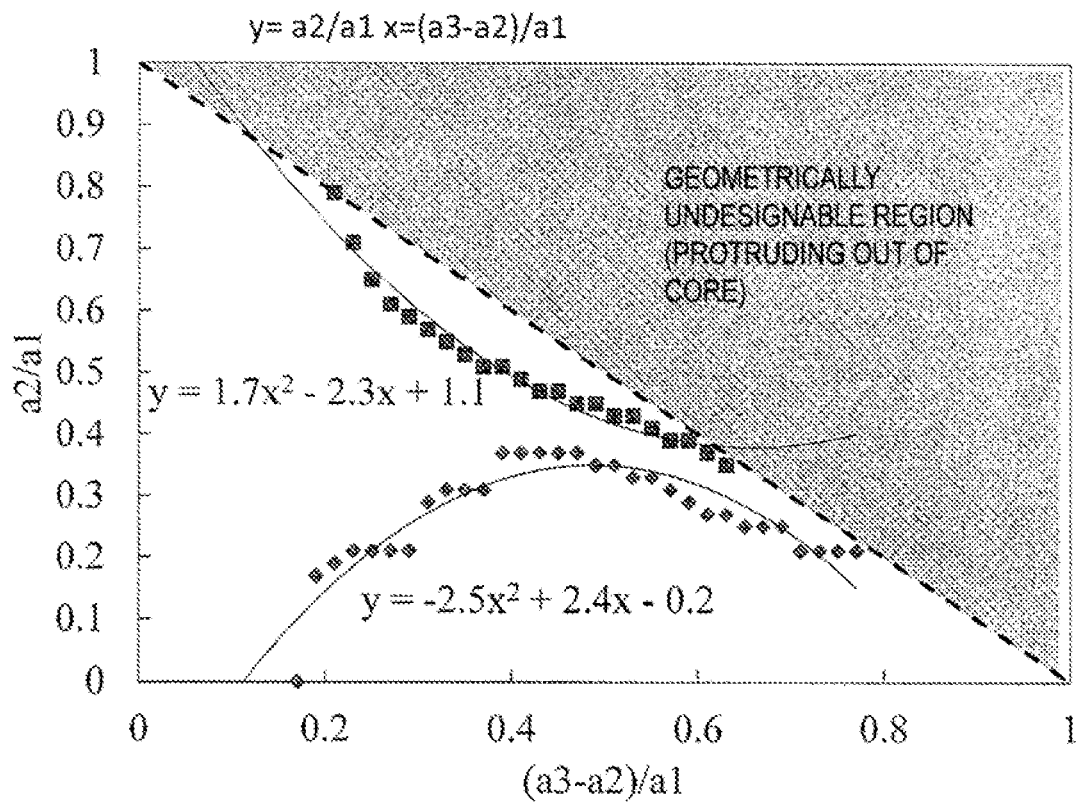
FIG. 14 is a diagram for explaining the relationship between the ranges of $(a_3-a_2)/a_1$ and $a_2/a_1$.

From FIG. 13, it was possible to obtain the upper and lower limit values of a2/a1 when (a3−a2)/a1=0.35 and $\Delta 2/\Delta 1$=1.35. Subsequently, the same calculation is performed with $\Delta 2/\Delta 1$=1.35 fixed while (a3−a2)/a1 varies. The relationship between (a3−a2)/a1 and the upper and lower limit values of a2/a1 is obtained and the relationship between the ranges of (a3−a2)/a1 and a2/a1 that satisfy the design conditions, when $\Delta 2/\Delta 1$=1.35, is shown in FIG. 14. In FIG. 14, a hatched region on the upper right is a region that cannot be designed geometrically because the high refractive index portion is disposed outside the core.

A square mark and a diamond mark indicate the upper and lower limit values of a2/a1 for given (a3−a2)/a1, respectively. The loss of four propagating modes can be suppressed to 0.1 dB or less by providing a high refractive index region of $\Delta 2/\Delta 1$=1.35 such that a2/a1 falls within a region between approximate curves of the upper and lower limit values, that is, −2.5x²+2.4x−0.2<a2/a1<1.7x²−2.3x+1.1 is satisfied for x=(a3−a2)/a1. This can increase the effective refractive index difference between the LP21 and LP02 modes. Here, the coefficients of the approximate curves are defined as a, b, c, d, e, and f as follows.

$$dx^2+ex+f < a2/a1 < ax^2+bx+c \quad (2)$$

Here, $x=(a3-a2)/a1$ (3)

In FIG. 14, a=1.7, b=−2.3, c=1.1, d=−2.5, e=2.4, f=−0.2.

In FIG. 14, the relationship between (a3−a2)/a1 and a2/a1 in which the loss of all modes is 0.1 dB or less, when $\Delta 2/\Delta 1$=1.35, has been obtained. Subsequently, a, b, c, d, e, and f have been obtained similarly from the relationship of the ranges of (a3−a2)/a1 and a2/a1 in which the connection loss of the 4LP modes is 0.1 dB or less while $\Delta2/\Delta1$ varies. Here, when $\Delta2/\Delta1<1.25$, an effective refractive index difference given by the high refractive index portion is small and has small effects because its converted value, in terms of a radius of an auxiliary waveguide, is 1 μm or less. Further, when $\Delta2/\Delta1>1.9$, values of a3−a2 with which the insertion loss is 0.1 dB or less are only 0.5 μm or less, which are difficult to manufacture and thus $\Delta2/\Delta1$ is set such that $1.25<\Delta2/\Delta1<1.9$.

Figure 15:
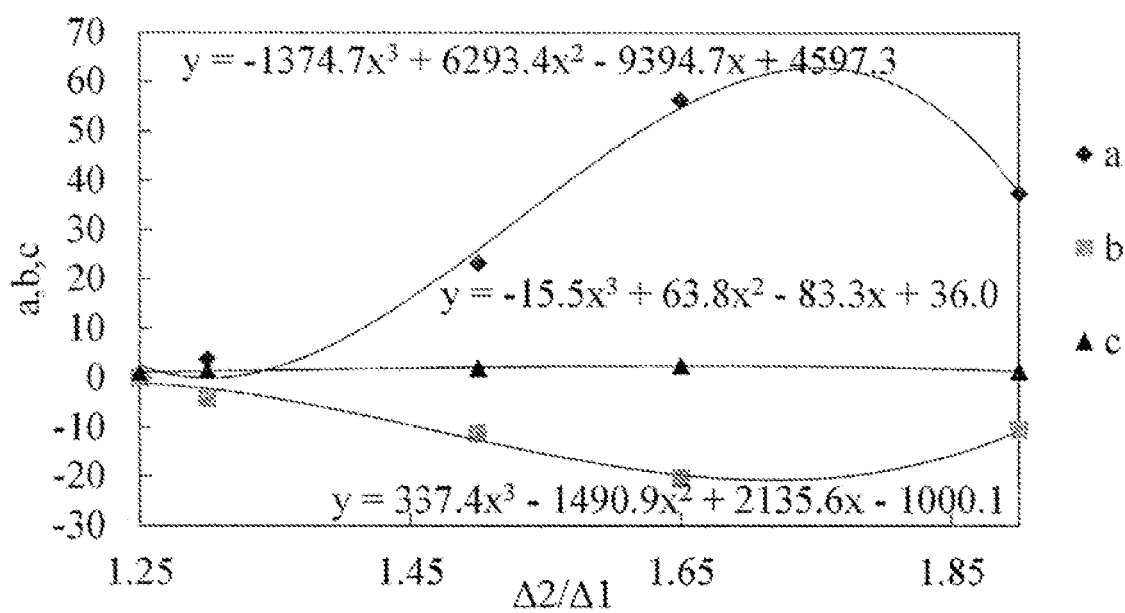
FIG. 15 is a diagram for explaining the relationship between $\Delta_2/\Delta_1$ and a, b, and c.
Figure 16:
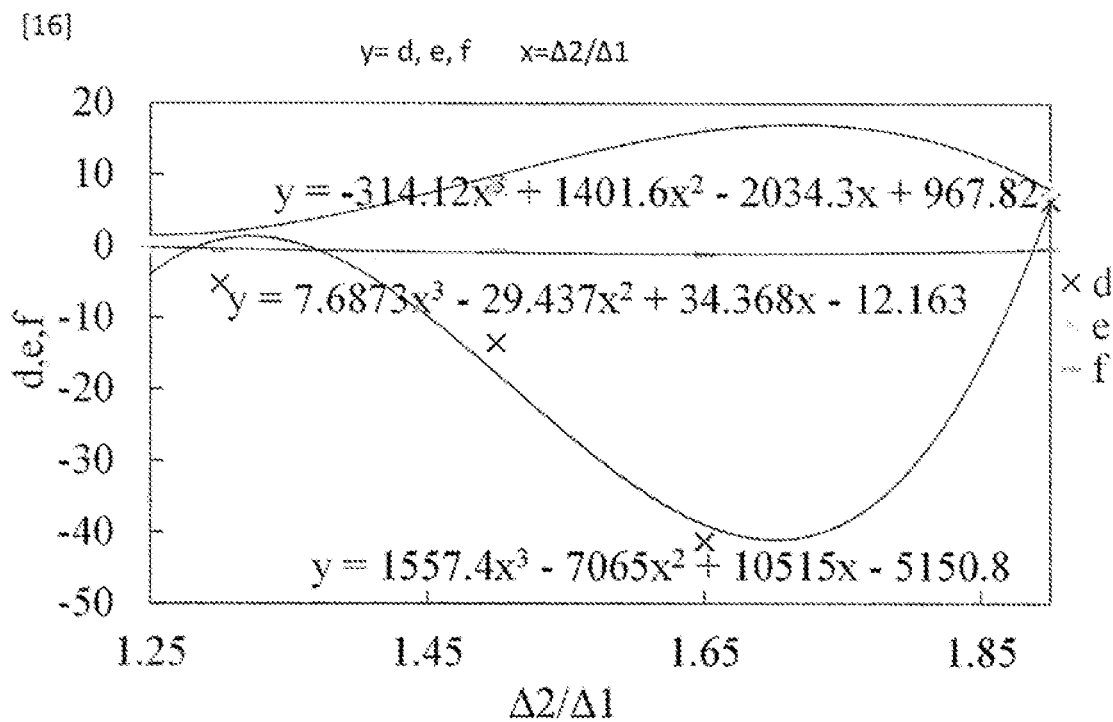
FIG. 16 is a diagram for explaining the relationship between $\Delta_2/\Delta_1$ and d, e, and f.

FIG. 15 shows the relationship between $\Delta2/\Delta1$ and a, b, and c and FIG. 16 shows the relationship between $\Delta2/\Delta1$ and d, e, and f. Thus, the effective refractive index difference between the LP21 and LP02 modes can be increased and the loss of the 4LP modes can be suppressed to 0.1 dB or less by providing a high refractive index region in an optical fiber so as to satisfy the following.

$$4.8<V<5.1 \quad (4),$$

$$a2/a1 \text{ satisfying that } dx^2+ex+f<a2/a1<ax^2+bx+c \quad (5),$$

$$\text{where } y=\Delta2/\Delta1 \text{ and } x=(a3-a2)/a1 \quad (6)$$

Note that (a3−a2)/a1 has an arbitrary value in a region in which the above value of a2/a1 exists and a3<a1 is satisfied. Here, a, b, c, d, e, and f are as follows.

$$a=-1374.7y^3+6293.4y^2-9394.7y+4597.3$$

$$b=337.4y^3-1490.9y^2+2135.6y-1000.1$$

$$c=-15.5y^3+63.8y^2-83.3y+36.0$$

$$d=1557.4y^3-7065y^2+10515y-5150.8$$

$$e=-314.12y^3+1401.6y^2-2034.3y+967.8$$

$$f=7.7y^3-29.4y^2+34.4y-12.2 \quad (7).$$

Here, $y=\Delta2/\Delta1$.

Calculation results of auxiliary waveguide radii for extracting LP21 and LP02 modes in a structure in which a ring-shaped high refractive index portion with (a3−a2)/a1=0.25, a2/a1=0.57 and $\Delta2/\Delta1=1.5$ satisfying the above design conditions is provided in an optical fiber having a conventional stepped index structure with a refractive index difference $\Delta=\Delta1=0.9\%$ and a core radius of 6.2 μm will now be described. In the conventional stepped index structure, an auxiliary waveguide radius for extracting the LP21 mode is 2.0 μm and an auxiliary waveguide radius for extracting the LP02 mode is 1.8 μm. Therefore, if the auxiliary waveguide radius deviates by 0.2 μm or more, trying to extract only one of the modes (for example, the LP21 mode) results in transferring the other mode (for example, the LP02 mode) together and thus it is difficult to selectively impart a loss. On the other hand, in the structure provided with the ring-shaped high refractive index portion, an auxiliary waveguide radius for extracting the LP21 mode is 3.0 μm and an auxiliary waveguide radius for extracting the LP02 mode is 2.0 μm, such that the difference in the optimum auxiliary waveguide radius can be increased to 1.0 μm.

Providing the ring-shaped high refractive index portion can increase the effective refractive index difference between the LP21 and LP02 modes and improve the manufacturing tolerance of the auxiliary waveguide radius as described above.

Third Embodiment

In an optical amplifier for multimode transmission, it is necessary to compensate the gain-wavelength spectrum of the optical amplifier according to the mode because a gain difference occurs depending not only on the mode but also on the wavelength due to the absorption coefficient or emission coefficient of rare earth ions of an optical fiber for optical amplification. The mode loss difference compensator of the present disclosure can be disposed subsequent to the optical amplifier for multimode transmission such that it can be used as a gain-wavelength equalizer of the optical amplifier.

Figure 17:
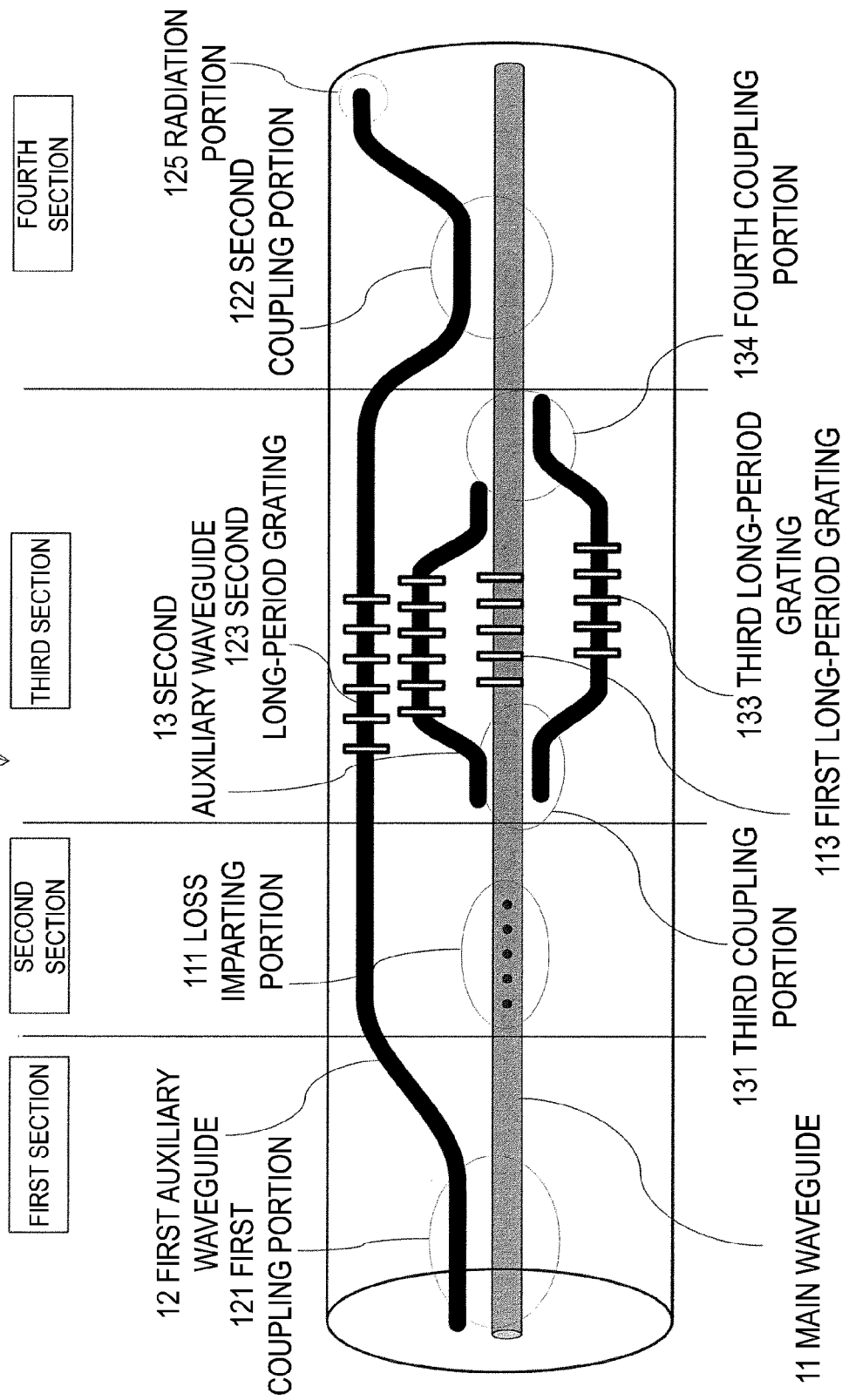
FIG. 17 is a diagram for explaining a configuration of another mode loss difference compensator.

FIG. 17 illustrates an example of a mode loss difference compensator used as a gain-wavelength equalizer. In FIG. 17, 20 indicates a mode loss difference compensator, 11 indicates a main waveguide, 111 indicates a loss imparting portion, 113 indicates a first long-period grating, 12 indicates a first auxiliary waveguide, 121 indicates a first coupling portion, 122 indicates a second coupling portion, 123 indicates a second long-period grating, 125 indicates a radiation portion, 13 indicates second auxiliary waveguides, 131 indicates a third coupling portion, 133 indicates third long-period gratings, and 134 indicates a fourth coupling portion. The difference of the mode loss difference compensator 20 of FIG. 17 from the mode loss difference compensator 10 illustrated in FIG. 1 is that the main waveguide 11 is provided with the first long-period grating 113 and the first auxiliary waveguide 12 is provided with the second long-period grating 123 to compensate the gain-wavelength spectrum. Another difference is that higher-order modes of the main waveguide 11 are mode-converted and transferred to the second auxiliary waveguides 13 and then returned back to the main waveguide 11 after the gain-wavelength spectrum is compensated by the third long-period gratings 133 of the second auxiliary waveguides 13.

As illustrated in FIG. 17, all higher-order modes propagating in the main waveguide are temporarily transferred to corresponding first and second auxiliary waveguides 12 and 13. The first long-period grating 113 provided on the main waveguide 11, the second long-period grating 123 provided on the first auxiliary waveguide 12, and the third long-period gratings 133 provided on the second auxiliary waveguides 13 impart loss to the loss-wavelength spectrums opposite to the gain-wavelength spectrums of the optical amplifier for the modes. Modes propagating in the first and second auxiliary waveguides 12 and 13 are converted back to corresponding propagation modes of the main waveguide 11 and transferred to the main waveguide, such that not only the difference in loss between modes but also the gain-wavelength spectrum of the optical amplifier can be compensated. The amounts of coupling for transfer from the first and second auxiliary waveguides 12 and 13 to the main waveguide 11 can be adjusted by the interaction lengths of the second or fourth coupling portions 122 or 134, respectively.

Advantageous of Present Disclosure

The mode loss difference compensator of the present disclosure described in the first to third embodiments can be formed directly in an optical waveguide or an optical fiber and can easily compensate for the difference in loss between modes with low loss as described above. Such compensation for the difference in loss between modes can contribute to increasing the transmission distance in mode multiplexing transmission.

INDUSTRIAL APPLICABILITY

The present disclosure can be applied to information and communication industries.

REFERENCE SIGNS LIST

10: Mode loss difference compensator
11: Main waveguide
111: Loss imparting portion
113: First long-period grating
12: First auxiliary waveguide
121: First coupling portion
122: Second coupling portion
123: Second long-period grating
125: Radiation portion
13: Second auxiliary waveguide
131: Third coupling portion
132: Terminal end portion
133: Third long-period grating
134: Fourth coupling portion
14: Cladding
20: Mode loss difference compensator

The invention claimed is:

1. A mode loss difference compensator comprising:
a main waveguide configured to allow propagation of N or more modes (where N is an integer of 3 or more);
a first auxiliary waveguide whose fundamental mode is phase-matched with an LP0n mode (where n is an integer of 2 or more) propagating in the main waveguide, the first auxiliary waveguide having, at one end thereof, a first coupling portion configured to mode-convert the LP0n mode (where n is an integer of 2 or more) propagating in the main waveguide into the fundamental mode in the first auxiliary waveguide and transfer the fundamental mode from the main waveguide to the first auxiliary waveguide and having, at the other end thereof, a second coupling portion configured to mode-convert the fundamental mode propagating in the first auxiliary waveguide into the LP0n mode (where n is an integer of 2 or more) in the main waveguide and transfer the LP0n mode from the first auxiliary waveguide to the main waveguide; and
at least one second auxiliary waveguide whose fundamental mode is phase-matched with a higher-order mode, other than any LP0n mode (where n is an integer of 2 or more), propagating in the main waveguide, the second auxiliary waveguide having, at one end thereof, a third coupling portion configured to convert the higher-order mode, other than any LP0n mode (where n is an integer of 2 or more), propagating in the main waveguide into the fundamental mode in the second auxiliary waveguide and transfer the fundamental mode from the main waveguide to the second auxiliary waveguide and having, at the other end thereof, a terminal end portion configured to eliminate the fundamental mode propagating in the second auxiliary waveguide from the second auxiliary waveguide,
wherein the main waveguide includes a loss imparting portion, configured to impart a loss to a fundamental mode propagating in the main waveguide, between the first and second coupling portions.

2. The mode loss difference compensator according to claim 1, wherein the at least one second auxiliary waveguide comprises a plurality of second auxiliary waveguides, and the plurality of second auxiliary waveguides, spaced apart at an angle obtained by dividing 90 degrees by a circumferential order of an LP mode propagating in each of the plurality of second auxiliary waveguides, are disposed at the third coupling portion.

3. The mode loss difference compensator according to claim 1, wherein the terminal end portion has a grating structure in which the fundamental mode propagating in the second auxiliary waveguide is converted into a cladding mode to be radiated to a cladding.

4. The mode loss difference compensator according to claim 1, wherein the terminal end portion has a tapered shape in which a waveguide radius of the second auxiliary waveguide gradually decreases.

5. The mode loss difference compensator according to claim 1, wherein the terminal end portion has a radiation structure in which the other end of the second auxiliary waveguide is disposed at a cladding interface.

6. A mode loss difference compensator comprising:
a main waveguide configured to allow propagation of N or more modes (where N is an integer of 3 or more);
a first auxiliary waveguide whose fundamental mode is phase-matched with an LP0n mode (where n is an integer of 2 or more) propagating in the main waveguide, the first auxiliary waveguide having, at one end thereof, a first coupling portion configured to mode-convert the LP0n mode (where n is an integer of 2 or more) propagating in the main waveguide into the fundamental mode in the first auxiliary waveguide and transfer the fundamental mode from the main waveguide to the first auxiliary waveguide and having, at the other end thereof, a second coupling portion configured to mode-convert the fundamental mode propagating in the first auxiliary waveguide into the LP0n mode (where n is an integer of 2 or more) in the main waveguide and transfer the LP0n mode from the first auxiliary waveguide to the main waveguide; and
at least one second auxiliary waveguide whose fundamental mode is phase-matched with a higher-order mode, other than any LP0n mode (where n is an integer of 2 or more), propagating in the main waveguide, the second auxiliary waveguide having, at one end thereof, a third coupling portion configured to convert the higher-order mode, other than any LP0n mode (where n is an integer of 2 or more), propagating in the main waveguide into the fundamental mode in the second auxiliary waveguide and transfer the fundamental mode from the main waveguide to the second auxiliary waveguide and having, at the other end thereof, a fourth coupling portion configured to mode-convert the fundamental mode propagating in the second auxiliary waveguide into the higher-order mode, other than any LP0n mode (where n is an integer of 2 or more), in the main waveguide and transfer the higher-order mode from the second auxiliary waveguide to the main waveguide,
wherein the main waveguide includes a loss imparting portion, configured to impart a loss to a fundamental mode propagating in the main waveguide, between the first and second coupling portions and a first long-period grating, having a predetermined loss-wavelength spectrum, between the first and second coupling portions,
the first auxiliary waveguide includes a second long-period grating, having a predetermined loss-wavelength spectrum, between the first and second coupling portions, and
the second auxiliary waveguide includes a third long-period grating, having a predetermined loss-wavelength spectrum, between the third and fourth coupling portions.

7. The mode loss difference compensator according to claim 6, wherein the at least one second auxiliary waveguide comprises a plurality of second auxiliary waveguides, and the plurality of second auxiliary waveguides, spaced apart at an angle obtained by dividing 90 degrees by a circumferential order of an LP mode propagating in each of the plurality of second auxiliary waveguides, are disposed at the third and fourth coupling portions.

8. The mode loss difference compensator according to claim 1, wherein the main waveguide is a stepped circular waveguide having a core radius of a1 and a specific refractive index difference $\Delta 1$ and has a ring-shaped high refractive index region having a specific refractive index difference $\Delta 2$ (where $\Delta 2 > \Delta 1$) with respect to a cladding in a region where a distance from a core center is a2 or more and a3 or less (where a2<a3<a1).

9. The mode loss difference compensator according to claim 8, wherein a V value determined from the core radius a1 and the specific refractive index difference $\Delta 1$ is in a range of 4.8<V<5.1 that allows propagation of a 4LP mode, the V value being defined as follows:

$$V = \frac{2\pi}{\lambda} a_1 n_1 \sqrt{2\Delta_1},$$ [Math. A]

where $\lambda$ is a wavelength and n1 is a core refractive index, and $$dx^2 + ex + f < a2/a1 < ax^2 + bx + c \quad (5)$$

is satisfied when $y = \Delta 2/\Delta 1$ and $x = (a3-a2)/a1$ (6), and a, b, c, d, e, and f are defined as follows:

$a = -1374.7y^3 + 6293.4y^2 - 9394.7y + 4597.3$ $b = 337.4y^3 - 1490.9y^2 + 2135.6y - 1000.1$ $c = -15.5y^3 + 63.8y^2 - 83.3y + 36.0$ $d = 1557.4y^3 - 7065y^2 + 10515y - 5150.8$ $e = -314.12y^3 + 1401.6y^2 - 2034.3y + 967.8$ $f = 7.7y^3 - 29.4y^2 + 34.4y - 12.2$ (7).

10. The mode loss difference compensator according to claim 6, wherein the main waveguide is a stepped circular waveguide having a core radius of a1 and a specific refractive index difference $\Delta 1$ and has a ring-shaped high refractive index region having a specific refractive index difference $\Delta 2$ (where $\Delta 2 > \Delta 1$) with respect to a cladding in a region where a distance from a core center is a2 or more and a3 or less (where a2<a3<a1).

11. The mode loss difference compensator according to claim 10, wherein a V value determined from the core radius a1 and the specific refractive index difference $\Delta 1$ is in a range of 4.8<V<5.1 that allows propagation of a 4LP mode, the V value being defined as follows:

$$V = \frac{2\pi}{\lambda} a_1 n_1 \sqrt{2\Delta_1},$$ [Math. A]

where $\lambda$ is a wavelength and n1 is a core refractive index, and $$dx^2 + ex + f < a2/a1 < ax^2 + bx + c \quad (5)$$

is satisfied when $y = \Delta 2/\Delta 1$ and $x = (a3-a2)/a1$ (6), and a, b, c, d, e, and f are defined as follows:

$a = -1374.7y^3 + 6293.4y^2 - 9394.7y + 4597.3$ $b = 337.4y^3 - 1490.9y^2 + 2135.6y - 1000.1$ $c = -15.5y^3 + 63.8y^2 - 83.3y + 36.0$ $d = 1557.4y^3 - 7065y^2 + 10515y - 5150.8$ $e = -314.12y^3 + 1401.6y^2 - 2034.3y + 967.8$ $f = 7.7y^3 - 29.4y^2 + 34.4y - 12.2$ (7).

* * * * *